United States Patent
Lalin

[11] Patent Number: 6,101,247
[45] Date of Patent: Aug. 8, 2000

[54] PAY TELEPHONE

[76] Inventor: Gary S. Lalin, 14311 Cerise Ave. #208, Hawthorne, Calif. 90250

[21] Appl. No.: 09/172,799

[22] Filed: Oct. 14, 1998

Related U.S. Application Data

[60] Provisional application No. 60/062,191, Oct. 16, 1997.

[51] Int. Cl.[7] ............................ H04M 17/00; H04M 1/00
[52] U.S. Cl. ........................ 379/143; 379/436; 379/428; 379/429; 379/150
[58] Field of Search ................................ 379/143–144, 379/145, 146, 147, 148, 149, 150, 151, 430, 433, 428, 434, 435, 436, 155, 445, 442, 359, 362, 361; 232/57, 57.5; 453/24, 26, 44–45

[56] References Cited

U.S. PATENT DOCUMENTS

| | | | |
|---|---|---|---|
| 4,638,121 | 1/1987 | Clark, Jr. | 379/145 |
| 4,763,352 | 8/1988 | Goff | 379/145 |
| 5,061,023 | 10/1991 | Soublier et al. | 379/145 |

*Primary Examiner*—Paul Loomis
*Assistant Examiner*—Rexford N Barnie
*Attorney, Agent, or Firm*—Robert J. Schaap

[57] ABSTRACT

A currency operated telephone, such as a coin operated telephone, and which is typically referred to as "pay telephone", having a uniquely designed outer housing capable of being wall mounted or supported in an upright or a self-standing position. The telephone housing has an openable hinged closure plate or so-called "flip lid", which carries on its exterior a face plate, and when opened, allows access to the interior of the telephone housing. The exterior of the face plate is arranged so that any information carried thereon is ergonomically visible to a user, whether the telephone is wall suspended or in a stand-alone surface supported position. When the closure plate is lifted and held in the opened position, direct access to a coin mechanism is obtained and access to a coin box, which collects the deposited currency for operation of the telephone, is also enabled. A coin return chute is also integral with the coin mechanism, such that installation and/or repair of the mechanism is easily enabled. Essentially all of the electronics for the telephone is mounted on a circuit board located on the inside of the closure plate and directly connects to a push button switch dialing mechanism on the closure plate of the telephone, such that easy repair or maintenance of the electronics and/or dialing mechanism is also easily enabled.

14 Claims, 14 Drawing Sheets

PAY TELEPHONE

RELATED APPLICATION

This application is a continuation-in-part of and based on my pending provisional patent application Ser. No. 60/062,191, filed Oct. 16, 1997, and entitled "DUAL MOUNT PAY TELEPHONE HOUSING".

BACKGROUND OF THE INVENTION

1. Field of the Invention

This invention relates in general to certain new and useful improvements in pay telephones and, more particularly, to pay telephones which can be self-supporting in a stand-alone condition or wall mounted and in which operating components of the pay telephone are easily mounted within an outer housing and easily serviceable in that housing.

2. Brief Description of the Related Art

Currency operated telephones, that is, telephones which operate upon the introduction of a currency, namely, so-called "pay telephones", are widely used and have been effectively operated by telephone companies for more than fifty years. These telephones typically operate on the basis of enabling the generation of dual tone multi-frequency dialing signals or enabling the completion of a telephone call when a proper amount of a currency (either paper currency or coin currency) has been introduced into the telephone. For this purpose, the telephone is equipped with a coin mechanism or a paper currency mechanism, such as a so-called "dollar bill acceptor". These telephones are also enabled by a telephone card via a card reading device.

During this period of time, many advances have been made in these pay telephones. The advances which have been introduced into these telephones are largely electronic type advances and include, for example, improvements in solid state circuitry designs, coin mechanisms, and use of dual tone multi-frequency dialing, as opposed to the voltage modulated digital signals obtained with rotary dial telephones. However, in large measure, the outer housing of the pay telephone has changed very little. The outer housings are typically formed of a steel box-like construction and are quite rigid and durable, as they must be, to preclude pilfering and theft of introduced currency. Nevertheless, the same box-like appearance which had started almost fifty years ago still obtains today, although with some relatively insignificant modifications.

All commercially available pay telephones are wall mounted telephones, or at least telephones fixedly mounted within and to walls of telephone stalls or walls or other supporting structure of telephone stands. Moreover, because of the box-like construction, these telephones are not capable of being mounted in both a wall suspended position and in a stand-alone position, since the center of gravity of the conventional wall mounted pay telephones causes them to tip over or become unstable if minimal pressure is applied to the upper dialing keys when the phone is in a free standing position. Furthermore, the face plate instructions, would not be readily readable in both such positions.

In addition to the foregoing, the operating components of the commercially available and proposed pay telephones, such as the currency acceptor, the electronic circuit board, the coin return mechanism, are all individual components with each physically mounted within the outer housing. Thereafter, various means for connecting these individual components together by various electrical cables, duct work and the like, is employed.

Furthermore, in these various commercially available and proposed pay telephones, there are usually several individual circuit boards which are employed and which are connected together. The key pad was connected to a digital dialing mechanism, such as a touch tone generator by means of electrical cables, and the dialing mechanism was connected to a processor by additional electrical cables. The actual telephone circuitry incorporated in those one or more circuit boards were connected to the hand set by additional electrical conductors. As a result of this type of construction, the actual assembly of pay telephones was labor intensive and, hence, the overall cost thereof was substantial.

Due to the complexity of the construction of the conventional pay telephone, maintenance or servicing was also labor intensive. In order to obtain access to one component, various disconnections had to be made. In addition, since all of the electronics was not incorporated on one circuit board, testing for any electronic failure became a difficult problem.

These conventional pay telephones with a heavy box-like construction, were usually constructed using a drawn metal process which is both expensive and requires a substantial amount of material to produce. Admittedly, they had a relatively strong theft-proof outer housing. However, this construction comes with a relatively high cost of construction and a substantial weight which also required a more sturdy supporting structure for mounting the telephone to that supporting structure. Thus, the presently existing pay telephones are costly, cumbersome, difficult to service and, even more so, relatively unattractive and certainly not capable of being moved, as is a private telephone system.

The prior art is replete with numerous U.S. patent references showing conventional pay telephone constructions. For example, the McGough U.S. Pat. No. 4,938,547 and the McGough U.S. Pat. No. 4,940,296 both disclose a conventional box-like housing which is only adapted for wall mounted construction. Moreover, it can be observed that the housing is complex and requires numerous parts for assembly.

U.S. Pat. No. 4,747,134 to Holland shows a conventional hook switch assembly which can be used in pay telephones and, again, relies upon a complex mechanism involving numerous electrical components and/or electromechanical components. This type of hook switch mechanism is expensive and subject to potential failure.

U.S. Pat. No. 3,846,594 to Morrell also discloses a conventional box-like and wall mounted telephone construction. Although the telephone housing in the Morrell patent is similar in appearance to the outer housing in each of the aforesaid McGough patents, it provides a somewhat different means for securing the front closure section to the body of the housing. Again, this Morrell patent also discloses the complexity of installing the numerous operating components.

U.S. Pat. No. 4,974,257 to Ibanez, et al further discloses a modular public telephone which uses a pair of telephone housings, one for containing the telephone operating mechanism and the other for receiving currency and includes, for example, a coin box. Again, the Ibanez patent discloses the complexity of the overall pay telephone construction and the use of separate individual components which must be connected together. Ibanez also discloses a touch tone pad arrangement for use on the front of the housing and the complexity of construction and integration with the other operating components of the pay telephone.

OBJECTS OF THE INVENTION

It is, therefore, one of the primary objects of the present invention to provide a pay telephone which is capable of being self-supported in a stand-alone condition and movable from one location to another or otherwise internally wall mounted and in a fixed position and which is effective in either of such positions.

It is another object of the present invention to provide a pay telephone of the type stated in which the tone generator or dialer for that telephone and face plate instructions are readily accessible to a user whether the telephone is mounted on a wall or in a stand-alone condition.

It is a further object of the present invention to provide a pay telephone of the type stated which is uniquely designed so that a currency acceptor and a credit card reader and the electronics of that telephone can be easily mounted on a closure plate for the telephone.

It is also an object of the present invention to provide a pay telephone of the type stated in which a front closure plate is capable of being lifted to a fully opened position and provides ready easy access to a currency acceptor and the interior operating components in the housing of the pay telephone.

It is another important object of the present invention to provide a pay telephone of the type stated in which a coin acceptor and coin return chute and other associated coin mechanism is all provided as an integral unit.

It is still a further object of the present invention to provide a pay telephone of the type stated in which the electronics in the form of a circuit board can be mounted and directly connected to the push button switches via a disconnectable pin header without the need for additional cumbersome cable connectors.

It is another salient object of the present invention to provide a method of constructing and operating a pay telephone and which allows for the use of that telephone in a stand-alone condition or in a wall mounted condition.

With the above and other objects in view, my invention resides in the novel features of form, construction, arrangement and combination of parts and components present described and pointed out in the claims.

SUMMARY OF THE INVENTION

The present invention relates to a currency operated, or so-called "pay telephone", which in one aspect is capable of being used as a stand-alone pay telephone capable of being moved from one position to another and which is capable of being used in wall mounted, that is, in a fixed upright position. In this respect, the term "wall mounted" is used in a broad sense to refer to any type of structure in which the pay telephone is physically mounted in a fixed upright position and not used in a stand-alone condition.

The pay telephone of the present invention is uniquely designed with an outer housing, not only providing enhanced aesthetics to the pay telephone, but also functionally increasing the overall efficiency of construction and operation of the pay telephone. In this respect, the pay telephone includes an outer housing with a somewhat inclined front portion. The outer housing of the pay telephone defines an enlarged interior compartment for receiving the operating components of the pay telephone.

An openable front plate or door, or so-called "closure plate", sometimes referred to as a flip lid, is mounted over an enlarged access opening in the front portion of the housing. The closure plate carries an outer face plate mounted thereon. This access opening leads to the interior of the housing and, when the closure plate is in the closed position, it completely closes the interior of the housing. However, the closure plate can be hingedly moved from an intermediate position to a fully opened position and, moreover, it is removable completely from the front of the housing in order to enable servicing of operating components therein and complete access to the interior of the housing.

The outer housing is also formed with a bottom wall, which may have feet or pedestals, if desired, but is capable of being disposed on a relatively flat supporting surface so that the housing is capable of being located in a self-standing or so-called "stand-alone" position. In addition, the back wall is relatively flat so that it can be mounted against a wall or other supporting structure. For this purpose, any conventional form of mounting means may be provided for mounting the telephone in a suspended position on a wall or similar supporting structure. Mounting means can also be provided for securing the telephone in a stand-alone position. Mounting holes with industry standard spacing permitting the unit to be mounted to a pre-existing mounting plate can be used for this purpose. Thus, the telephone housing can be located on a shelf, table or the like and moved about in such a position or mounted thereto, or otherwise, it can be fixedly mounted on a wall or other supporting structure.

The closure plate and face plate carried thereby is inclined at a angle such that access to a dialing assembly on that face plate is readily accessible when either in the wall mounted position or the stand-alone position. Moreover, operating instructions which may be mounted on the face plate are also readily viewable by a user in either of those positions.

The pay telephone of the invention is uniquely constructed so that it relies upon a minimum number of individual assemblies for operation of the telephone. Thus, a currency mechanism is mounted in the pay telephone and integrally includes its own coin return chute which opens on the front of the telephone housing. This currency mechanism also includes a coin exchange mechanism located to receive currency coins introduced into a coin receive slot located on the face plate of the telephone housing.

In another embodiment of the invention, the dialer preferably exists in the form of a touch tone pad. Touch tone pads are conventionally used in many telephones and usually exist in the form of a tone generator and include an individual circuit board with push button switches mounted thereon and associated bezels, retaining clips and related hardware. In the present invention, the touch tone pad is mounted on the inside of the closure plate of the telephone housing and actually electrically communicates directly with a circuit board mounted immediately beneath the touch tone pad without need for separate electrical connecting wire conductors. The touch tone pad, in this respect, can actually be a part of or mounted directly onto the circuit board. In this way, the common need to electrically connect the keyboard directly to the electronics is avoided.

The access opening to the interior of the housing is sufficiently large so that the major operating components in the housing are readily accessible and convenient servicing is enabled. For this purpose, the closure plate also provides closure to the interior and, in addition, the face plate and closure plate provides an effective means for mounting of various mechanical components forming part of the pay telephone, such as coin return levers, hand set cradles, and dialing keys. The face plate provides an aesthetic appearance along with a recessed channel to provide a means for limiting travel of a coin release lever mechanism. The closure plate is also provided on its interior surface with means for holding electrical components, as well as maintaining electrical alignment and registration for connection of various electrically operable components, such as conductive membranes, printed circuit boards, magnetic card readers, and the like.

The closure plate or lid is provided with a unique hinge mechanism and cooperates with a hinge receptacle on the housing for attaching the closure plate. The closure plate can pivot about a hinge access defined by the hinge mechanism and can also be disengaged completely from the housing in order facilitate repair and servicing, as well as assembly. Thus, the closure plate can be rotated and engaged and held in an upper position where it is out of the way, such as for purposes of removing currency introduced into the housing or it can be completely removed from the housing and remounted thereon.

The currency mechanism comprises a coin box which accumulates and stores currency coins. The coin box has a protrusion which provides a detachable means for releasably locking the coin box to the body. The protrusion is capable of being pulled into a locked position in the housing when a locking mechanism associated with the coin box is in the locked position. It also provides a means for securing the closure plate to the body in a locked position. The locking mechanism extends through a portion of the closure plate and the coin box. Thus, when the coin box is held in a locked position, the closure plate itself is locked in the closed position through the coin box.

The housing is further provided with a U-shaped escrow bracket which provides a means for securing and aligning a coin escrow mechanism to the closure plate. In this way, a simple escrow arrangement can be easily and readily disposed within the escrow bracket and mounted therein.

The present invention also provides a lanyard retainer in the form of a U-shaped rectangular bracket on the side wall of the body for securing a handset lanyard cable and cord sheath to the inside of the body. A hole is formed in the lanyard retainer bracket for holding the handset cord sheath in a fixed position. The lanyard cable is also threaded through a narrow part of a keyway. The cable is then ultimately connected to the telephone switching system. However, the lanyard retainer holds the cable with the sheath therearound in a fixed position so that it does not become entangled with other operating components within the housing.

The pay telephone of the invention has a modular circuit board interface design so that differing circuit boards can actually be secured to the closure plate and, hence, to the mechanism of the pay telephone. In this way, it is also possible to substitute one circuit board for another in the event of improper electrical operation of the telephone, without the necessity of engaging in extensive connection and disconnection of electrical components. The hinge on the upper end of the closure plate is a seamless hinge which enables either entire removal of the closure plate or a locking of the closure plate in an opened position. There is a single lock mechanism provided for accessing both the interior of the pay telephone and the coin box itself.

This invention possesses many other advantages and has other purposes which may be made more clearly apparent from a consideration of the forms in which it may be embodied. These forms are shown in the drawings forming a part of and accompanying the present specification. They will now be described in detail for purposes of illustrating the general principles of the invention. However, it is to be understood that the following detailed description and the accompanying drawings are not to be taken in a limiting sense.

BRIEF DESCRIPTION OF THE DRAWINGS

Figure 1:
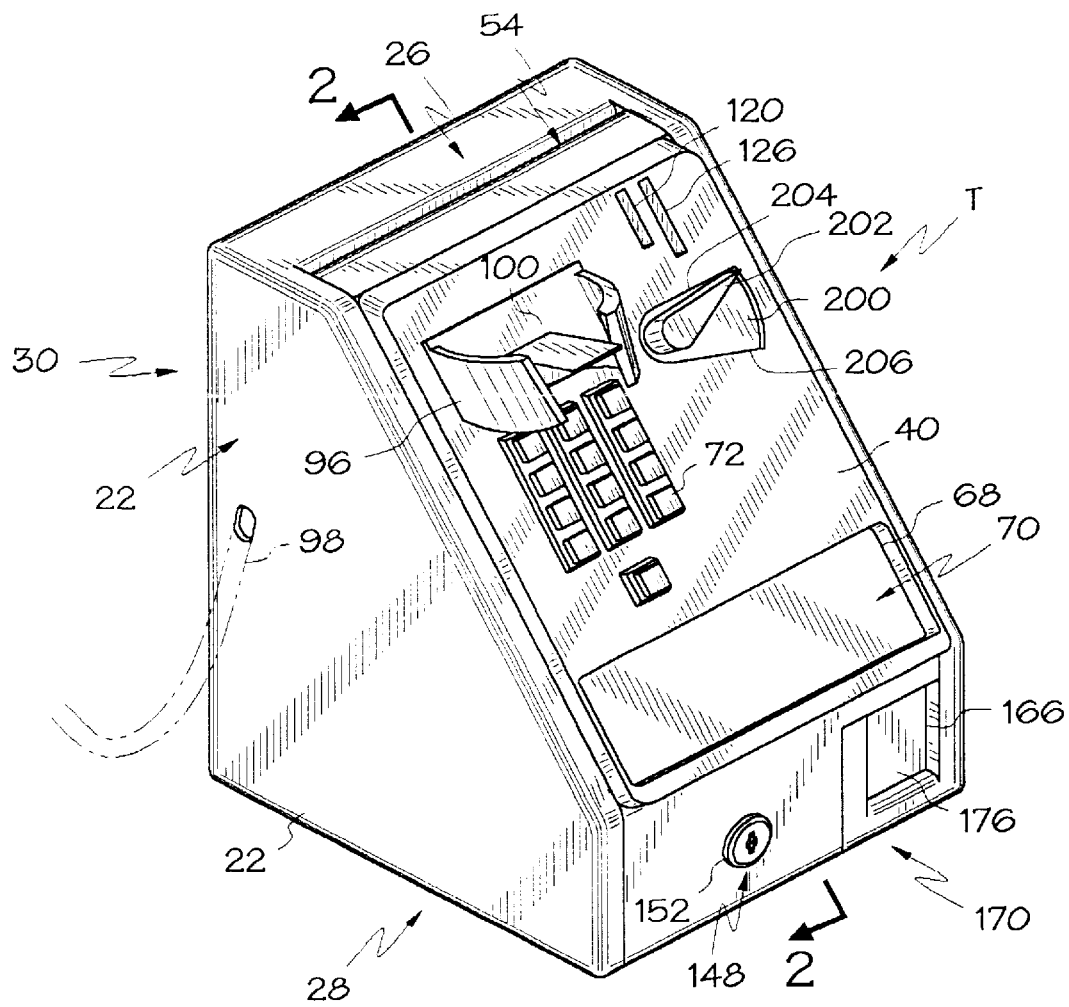
Figure 2:
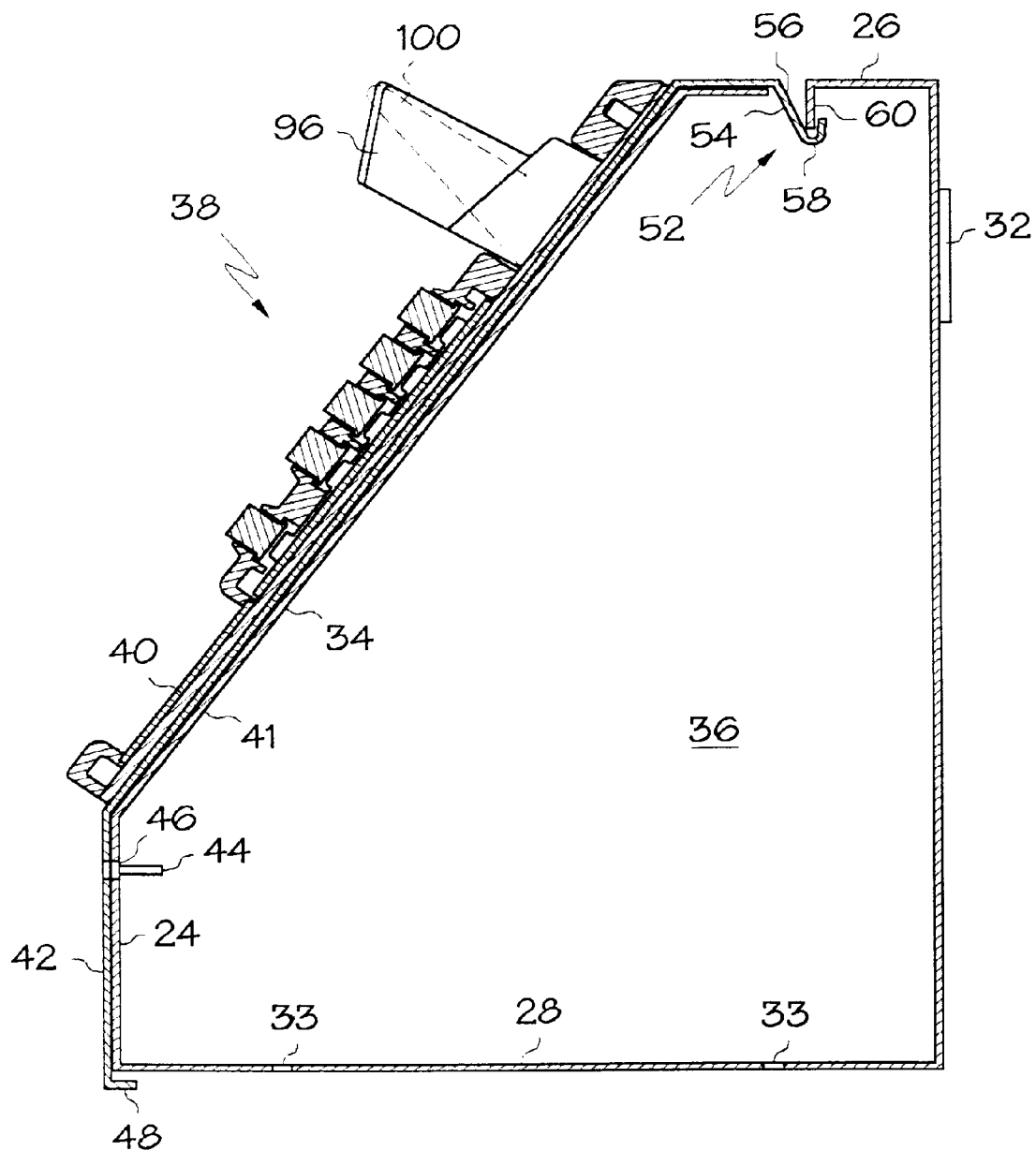
Figure 3:
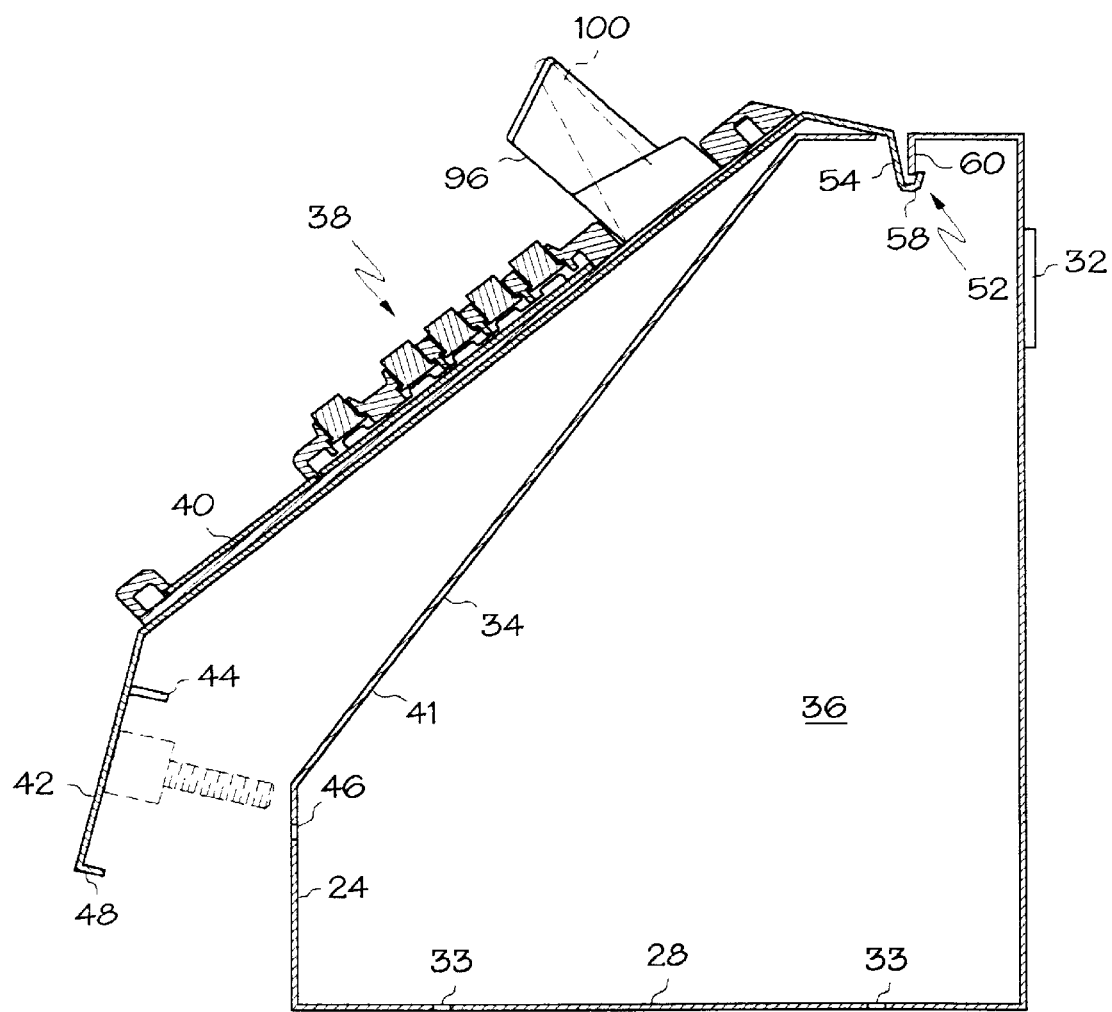
Figure 4:
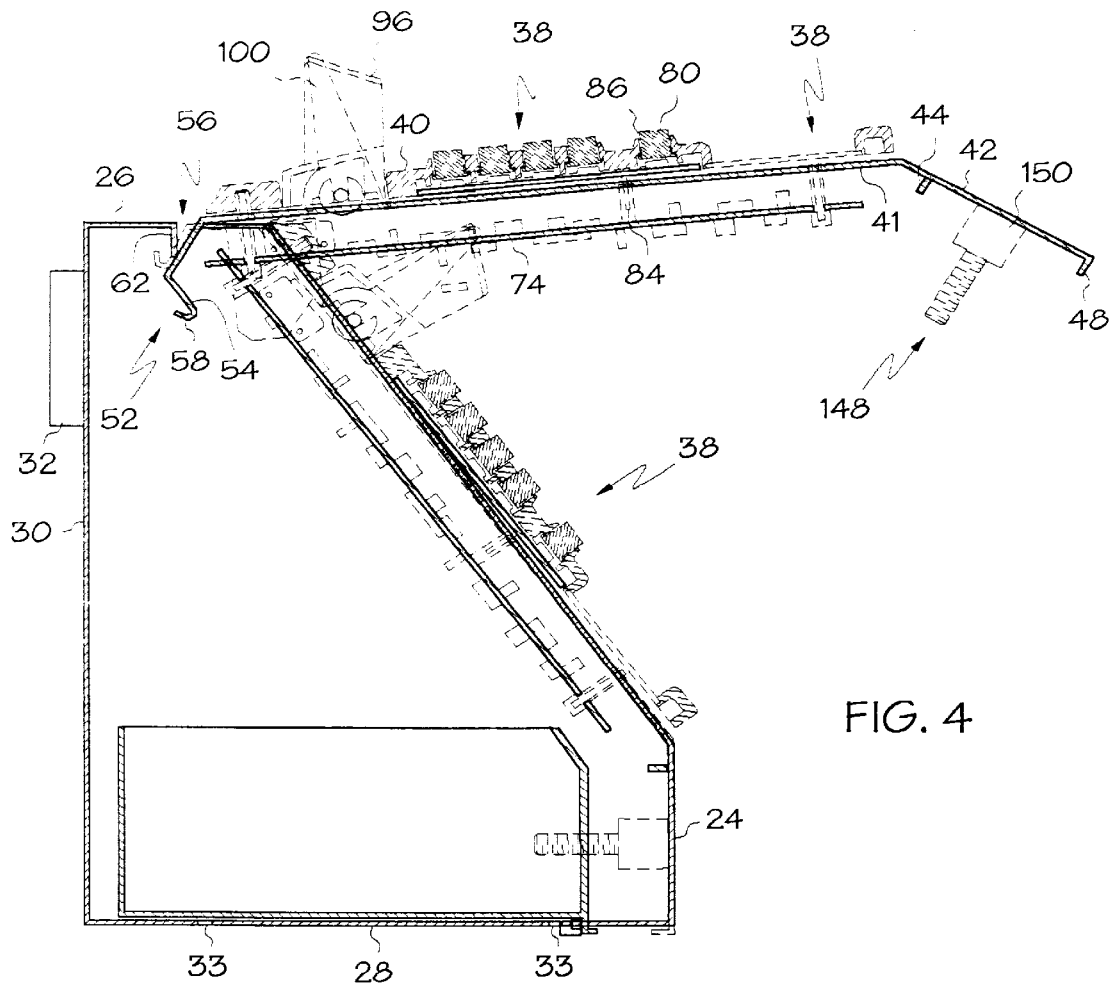
Figure 5:
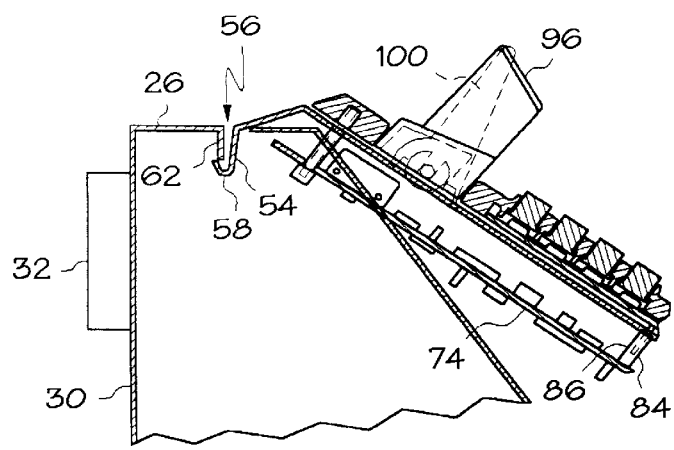
Figure 6:
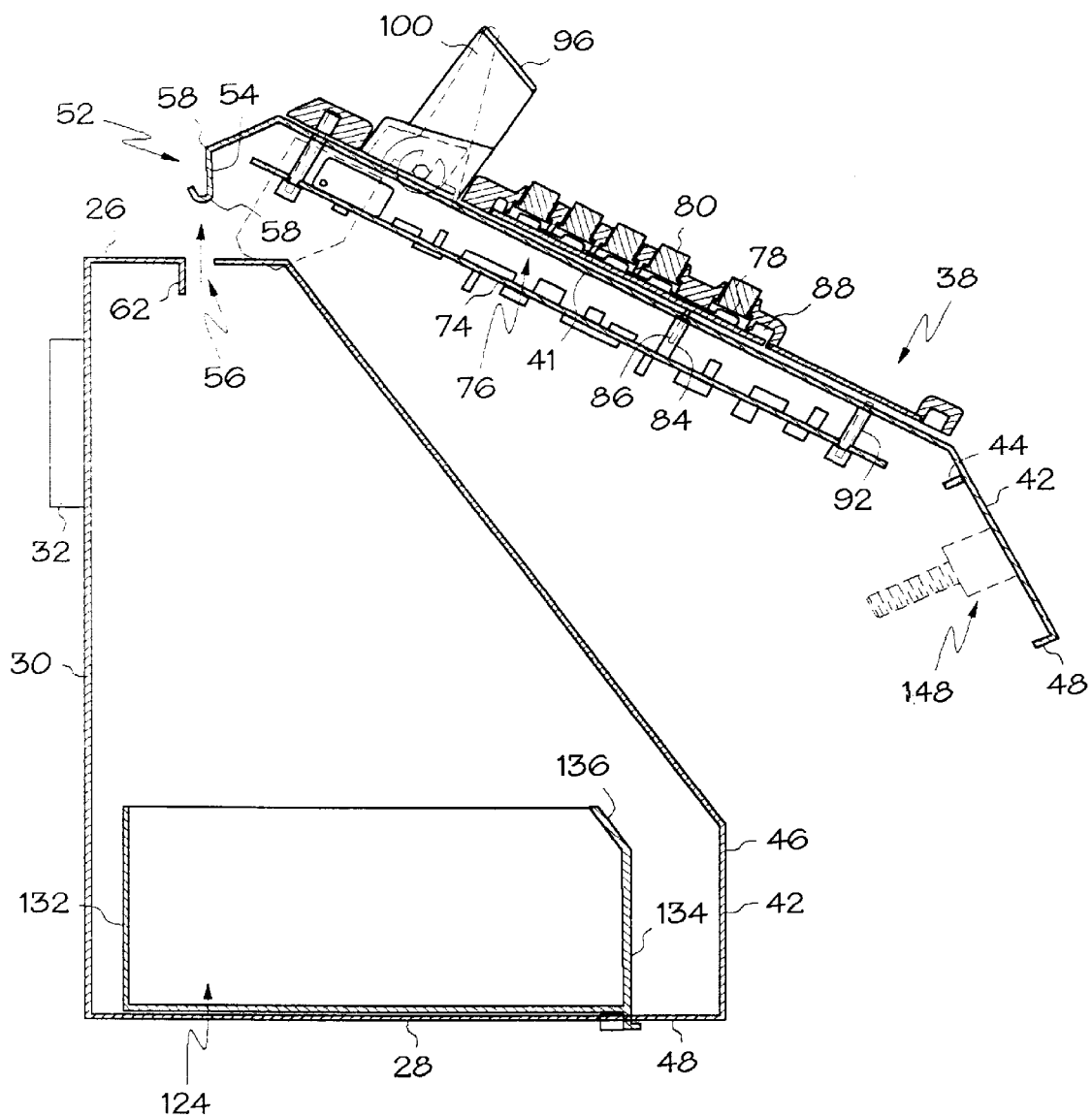
Figure 7:
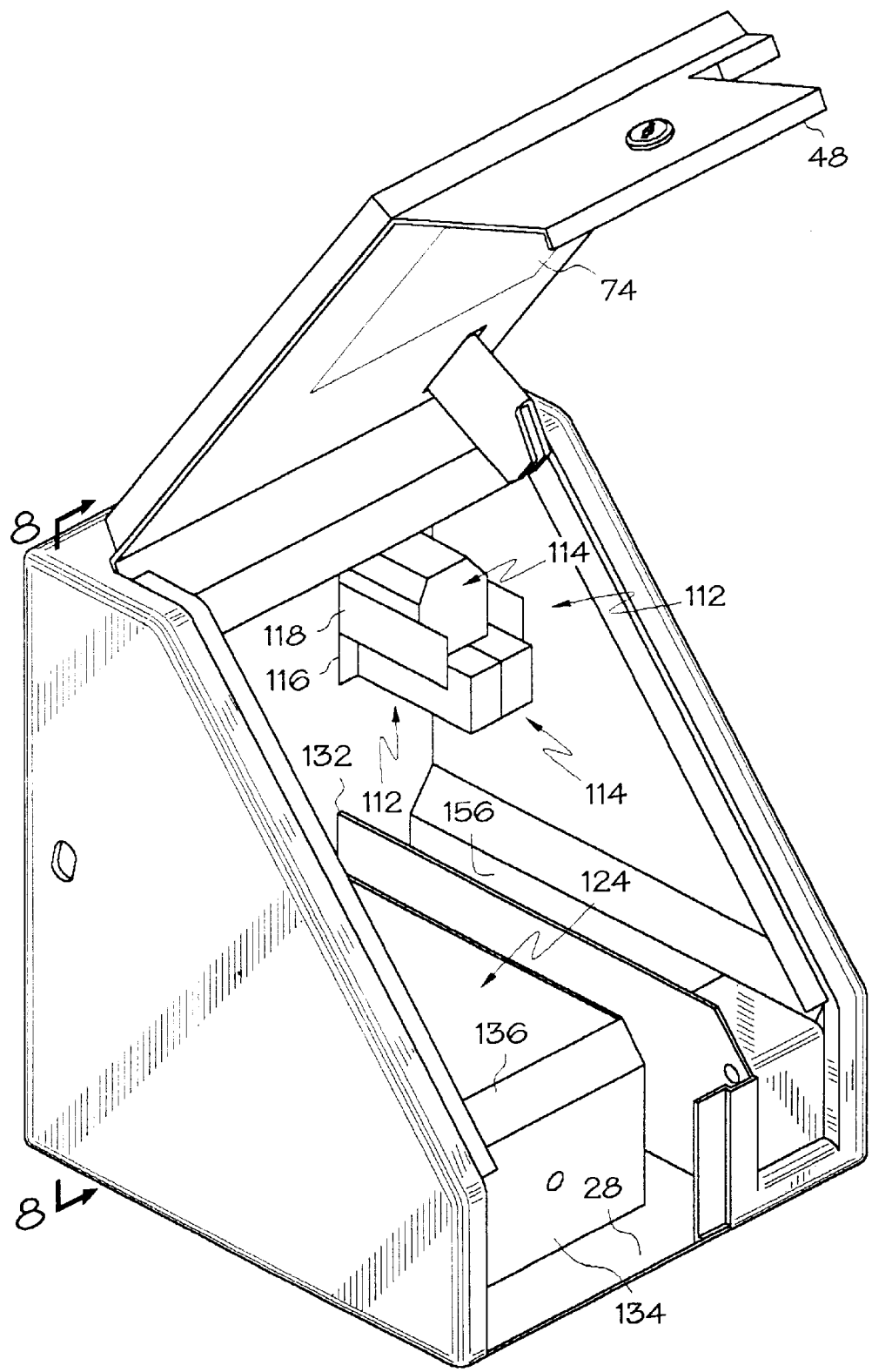
Figure 8:
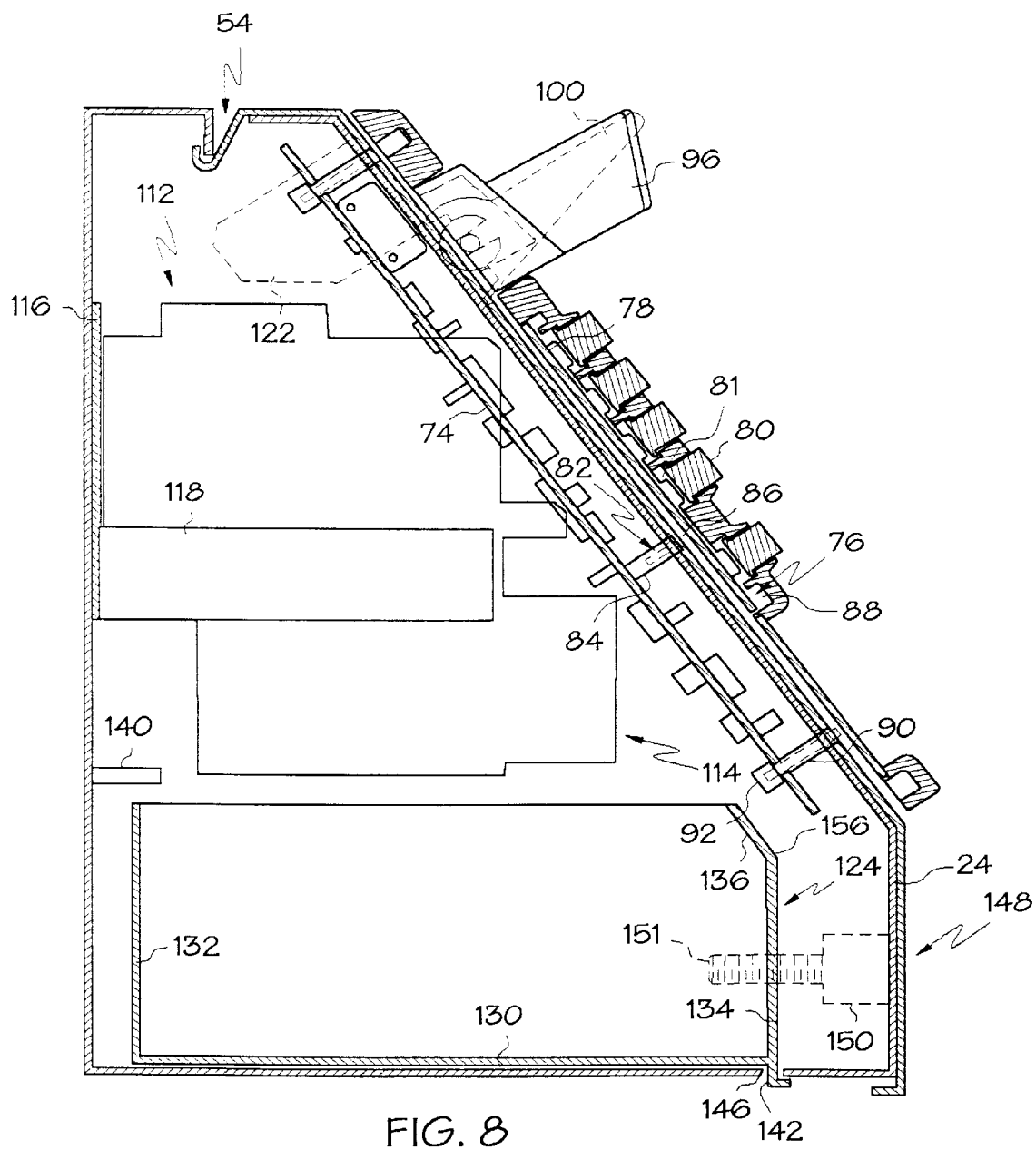
Figure 9:
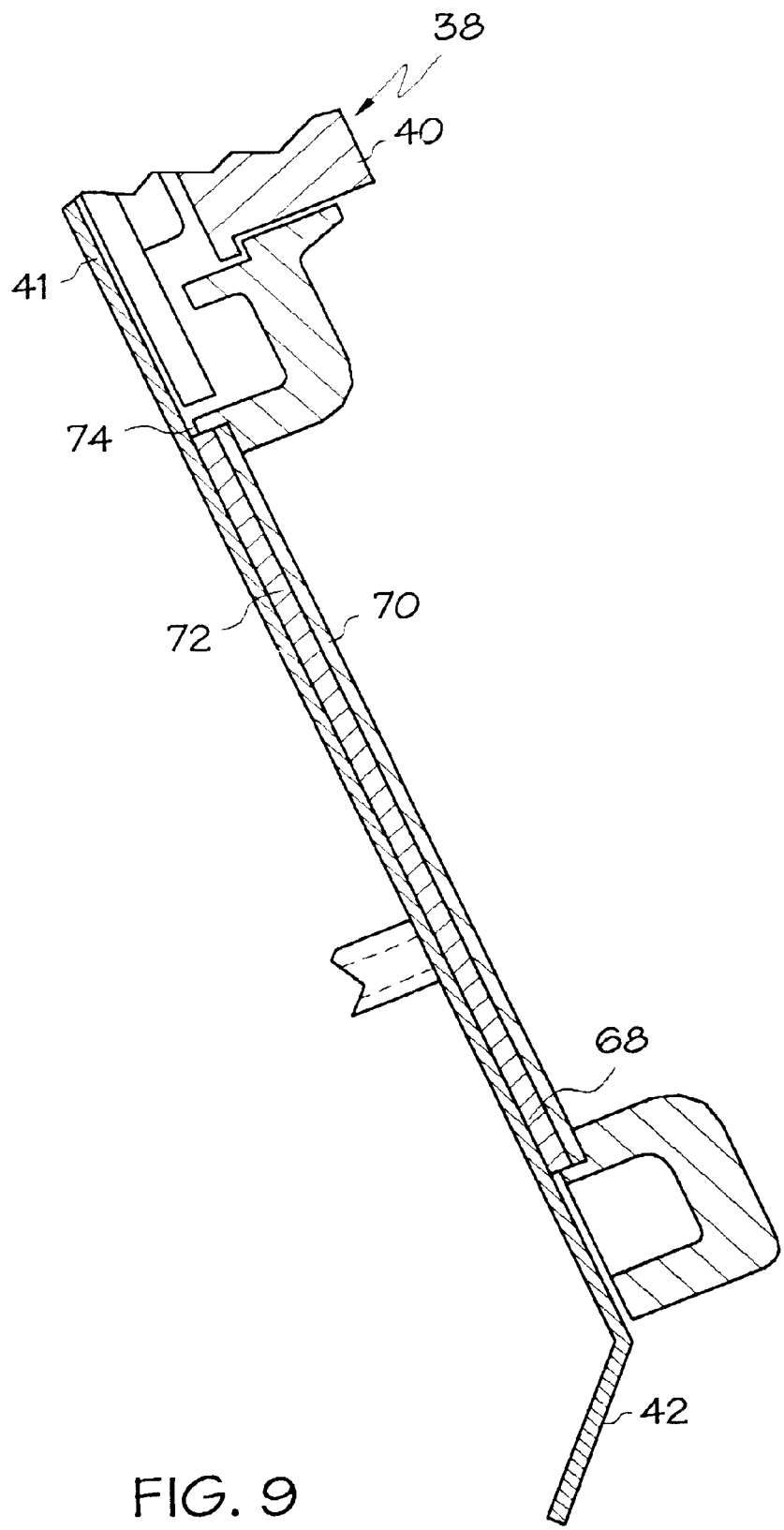
Figure 10:
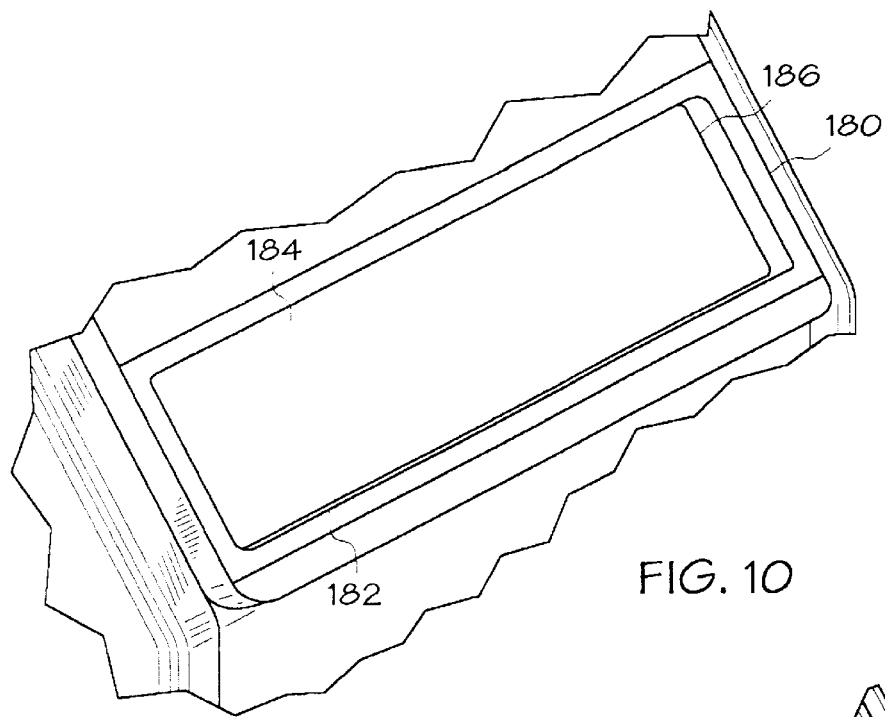
Figure 11:
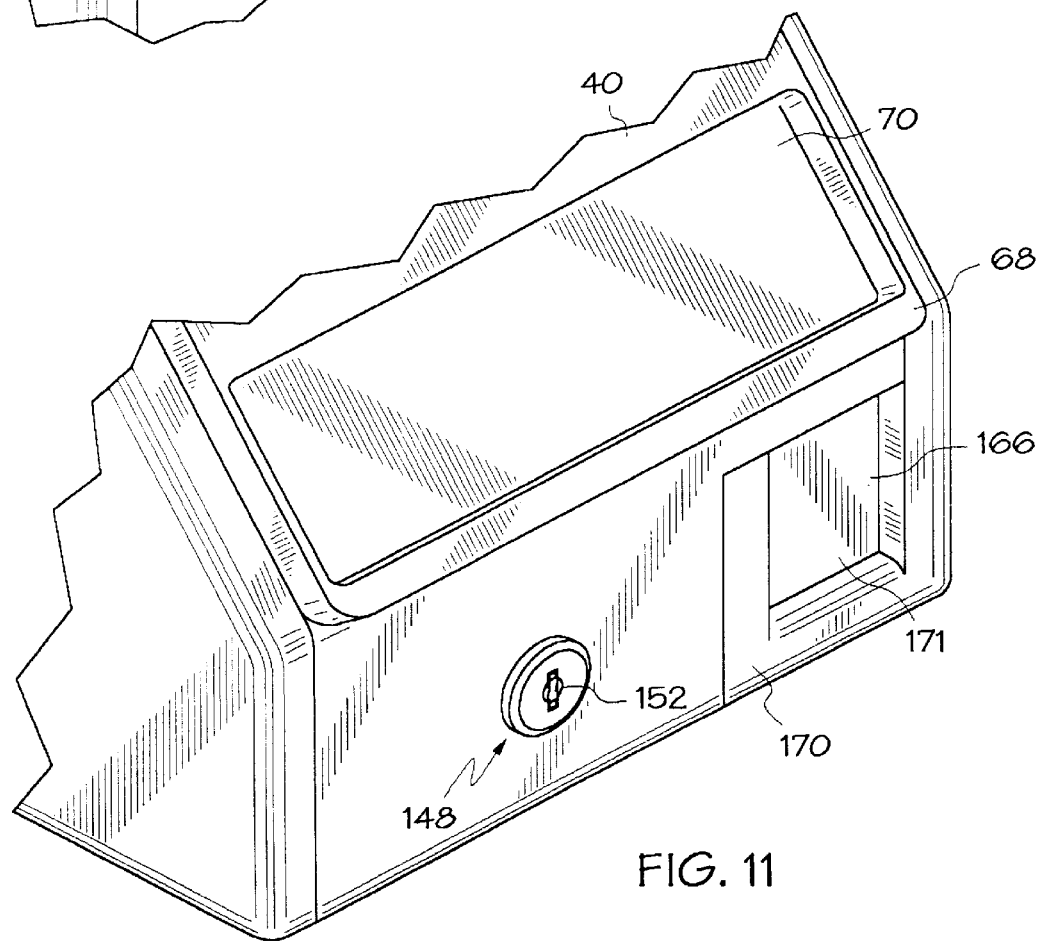
Figure 12:
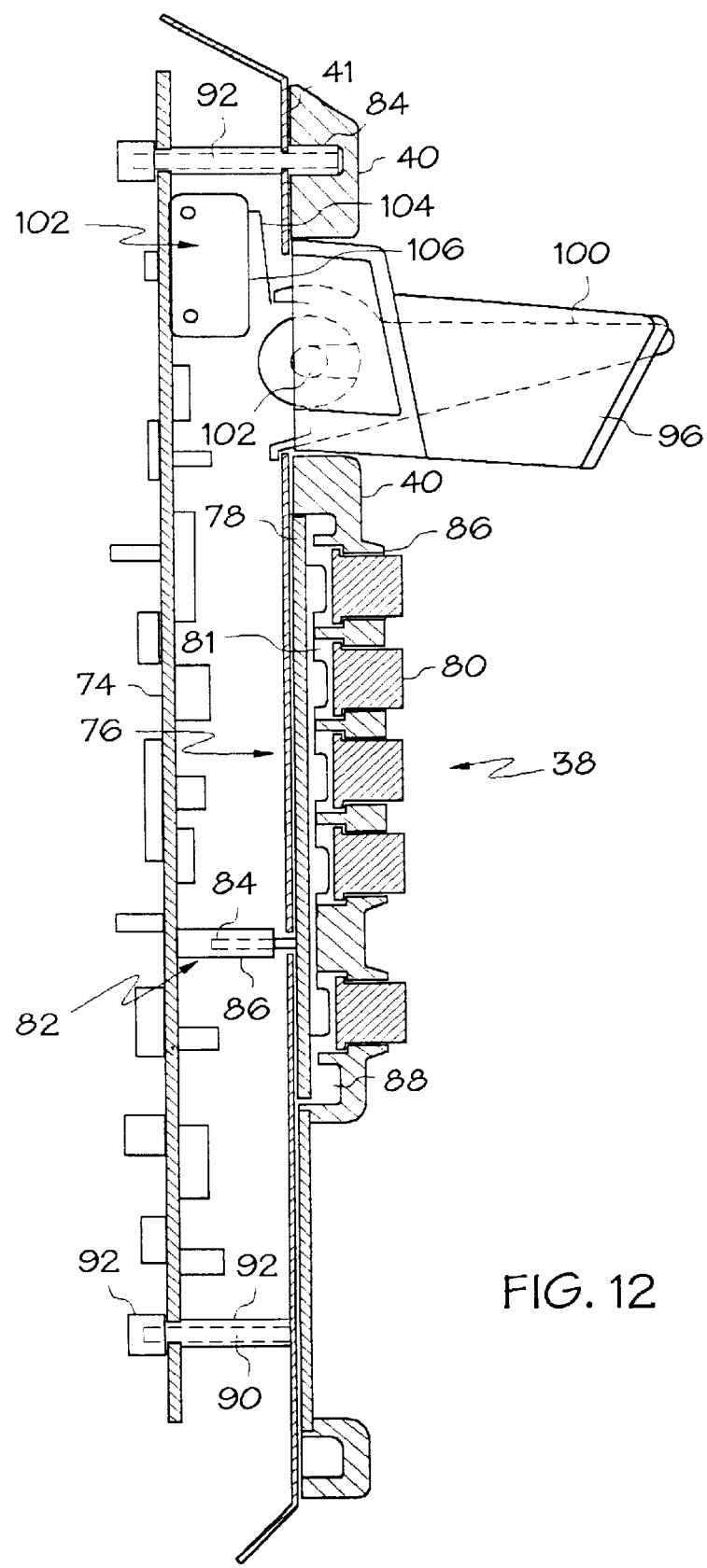
Figure 13:
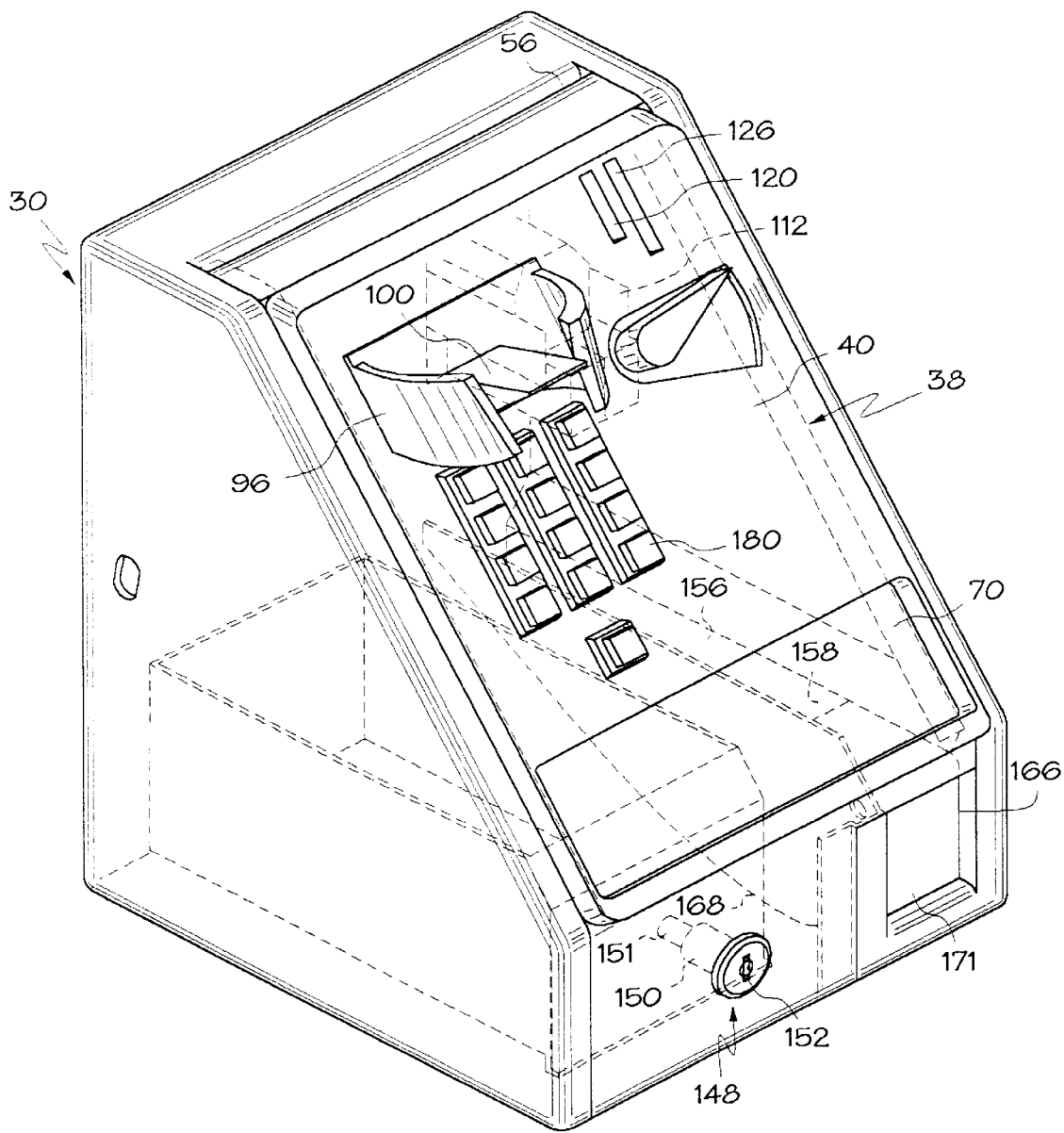
Figure 14:
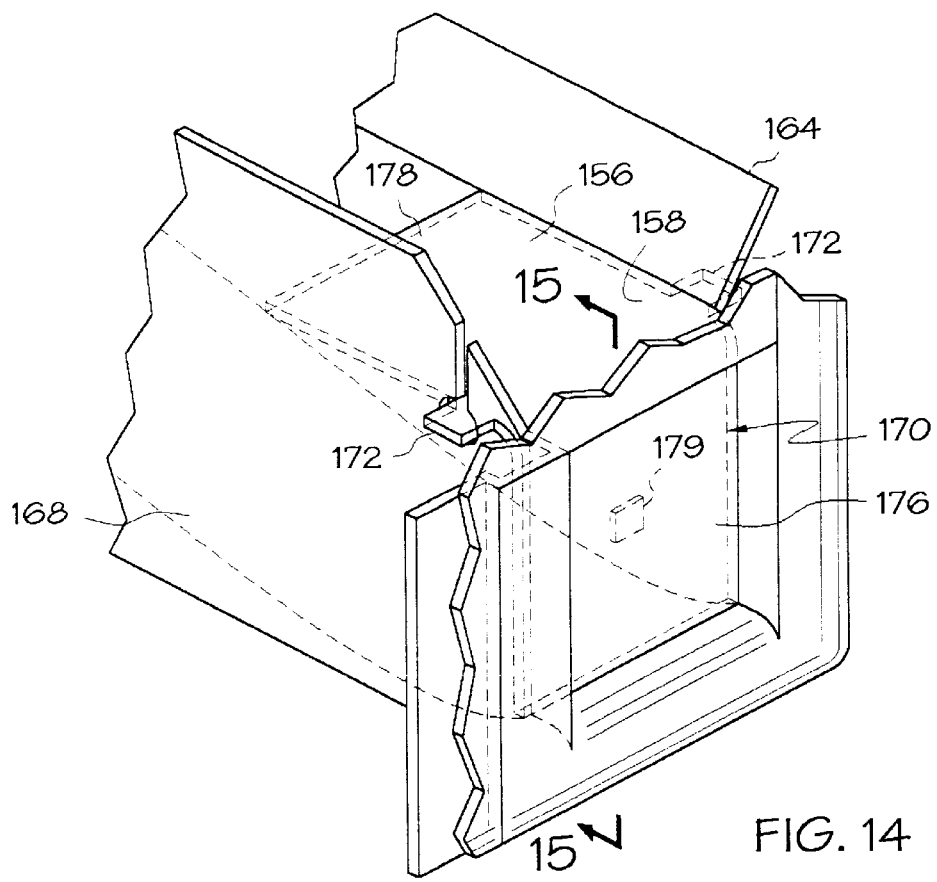
Figure 15:
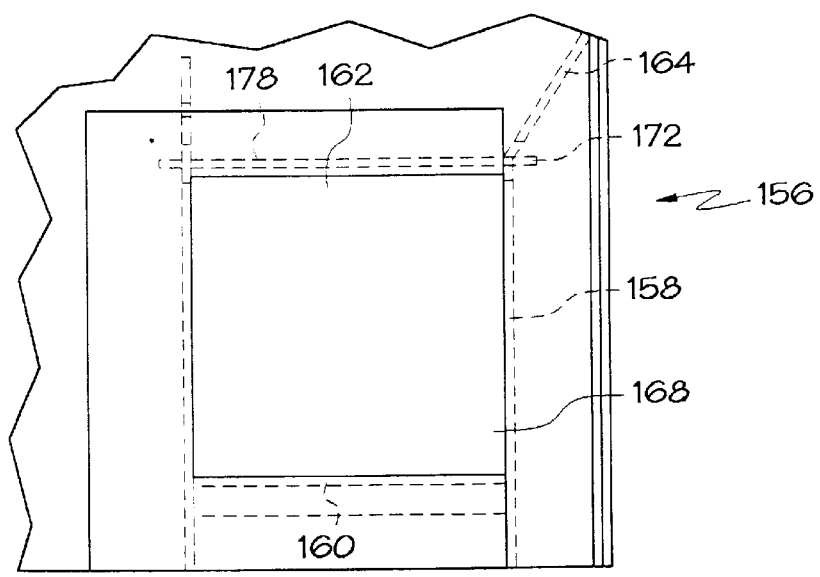
Figure 16:
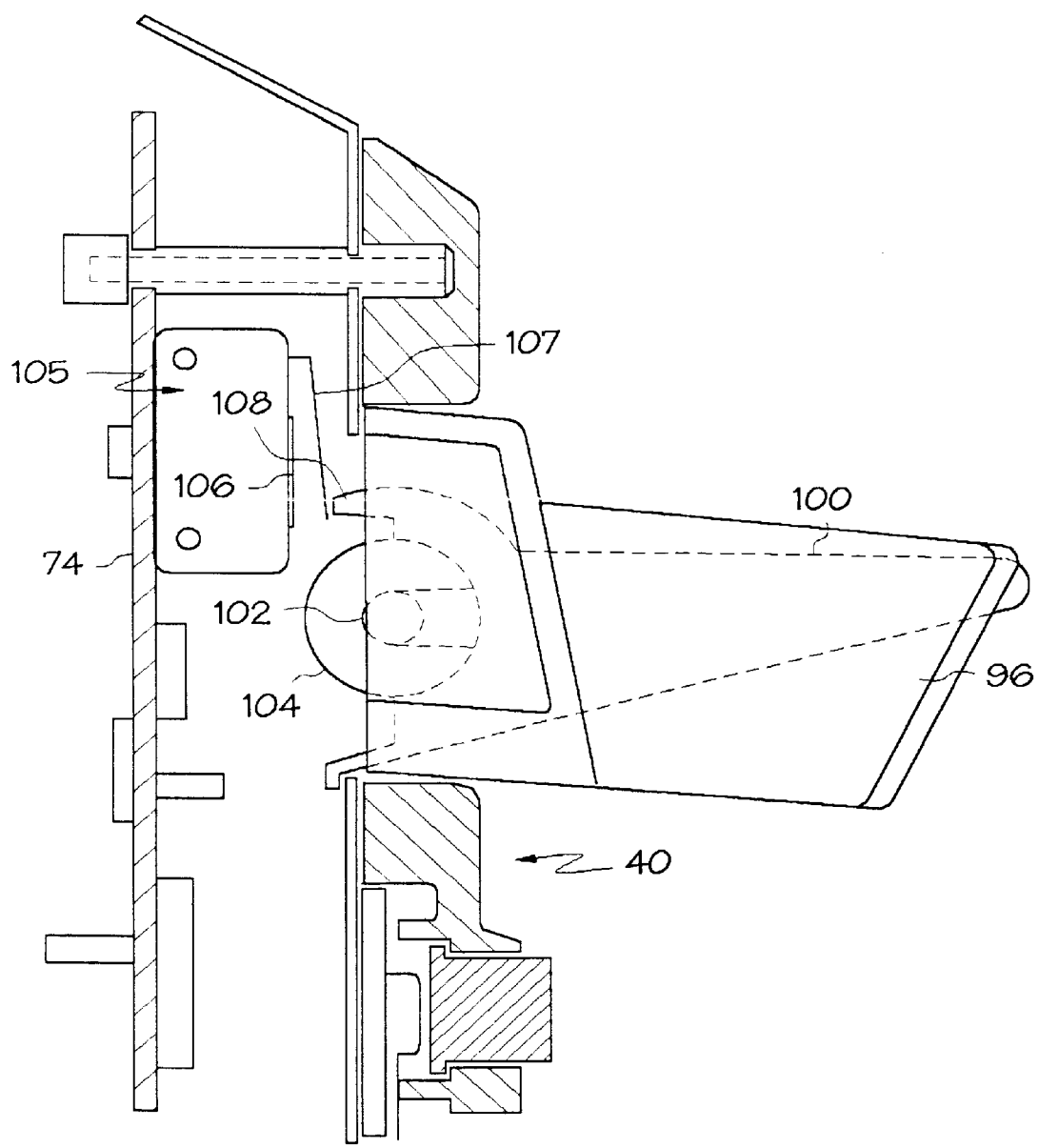
Figure 17:
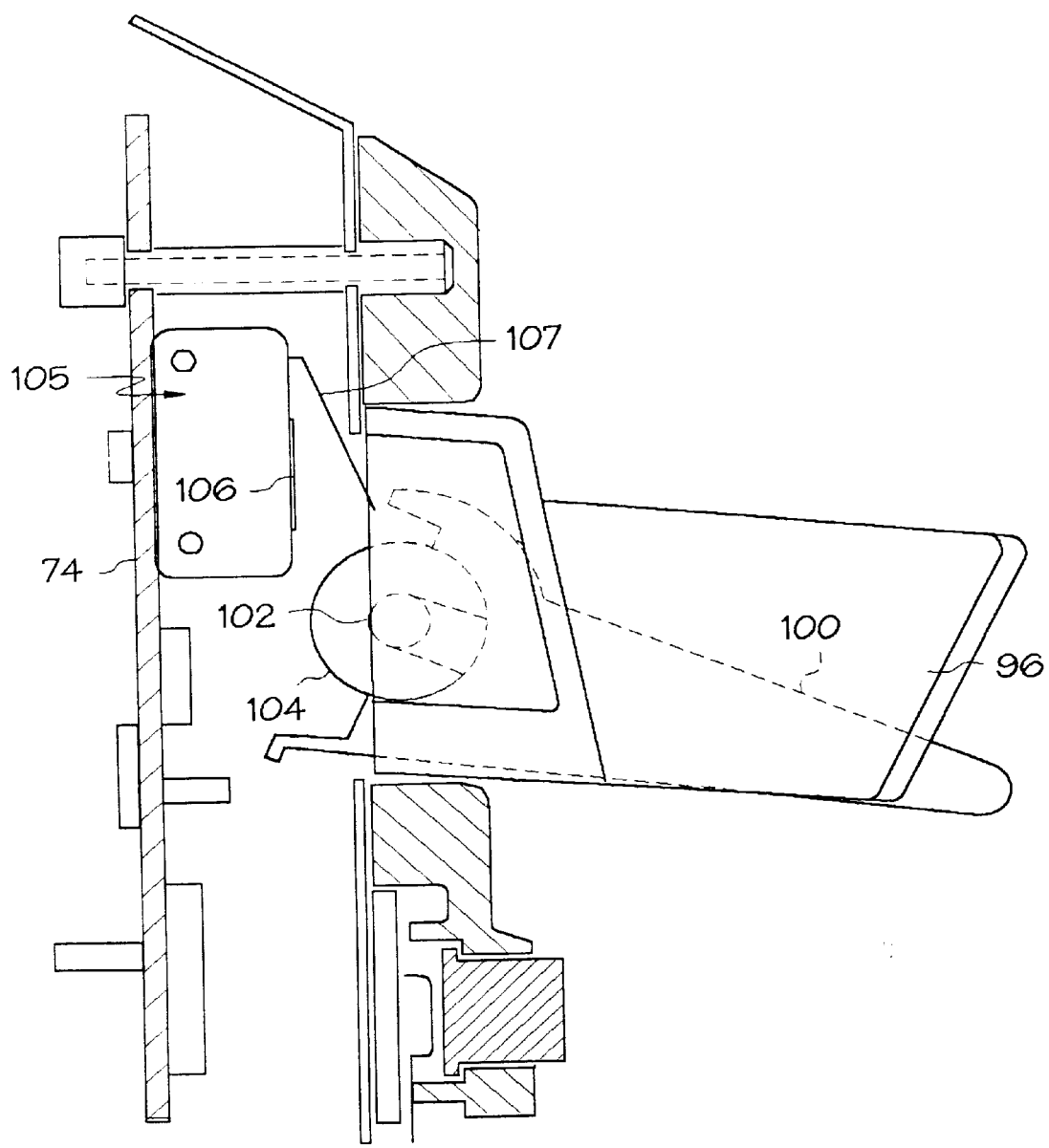

Having thus described the invention in general terms, reference will now be made to the accompanying drawings in which:

FIG. 1 is a perspective view of a pay telephone constructed in accordance with and embodying the present invention;

FIG. 2 is a vertical sectional view taken substantially along line 2—2 of FIG. 1 and showing the interior of the outer housing with the operating components located on the interior of the housing removed for purposes of clarity;

FIG. 3 is a vertical sectional view, similar to FIG. 2, and showing the closure plate of the telephone housing in a partially opened position;

FIG. 4 is a vertical sectional view, similar to FIGS. 2–3, and showing the closure plate and the position of the hinge mechanism when the closure plate is engaged and locked in a fully opened position;

FIG. 5 is a fragmentary vertical sectional view, similar to FIGS. 2–4, and showing the position of the hinge mechanism when the closure plate is in a position for complete removal from the housing;

FIG. 6 is a vertical sectional view, similar to FIGS. 2–5, and showing the closure plate of the housing in a fully opened position and showing the interior components forming a part of the telephone housing;

FIG. 7 is a perspective view showing a portion of the interior of the housing of the pay telephone of the present invention;

FIG. 8 is a vertical sectional view taken along line 8—8 of FIG. 7, but showing the face plate in a closed position with respect to the housing and also showing certain of the interior operating components of the pay telephone;

FIG. 9 is an enlarged fragmentary sectional view showing a portion of the closure plate and the face plate with the means for locating an information bearing card;

FIG. 10 is a fragmentary perspective view showing a modified form of information bearing card receiving member on a face plate in accordance with the present invention;

FIG. 11 is a fragmentary perspective view showing a portion of the front of the telephone housing;

FIG. 12 is a fragmentary vertical sectional view showing the securement of the circuit board to the closure plate of the housing and the connection of a touch tone pad to the circuit board using pin connectors in accordance with the present invention;

FIG. 13 is a perspective view, partially in phantom lines, and showing a portion of the coin return mechanism and the coin box forming part of the present invention;

FIG. 14 is a fragmentary perspective view of a portion of a coin release box forming part of the pay telephone;

FIG. 15 is a fragmentary vertical sectional view taken substantially along line 15—15 of FIG. 14 and showing the front of the coin return mechanism of the invention;

FIG. 16 is a fragmentary vertical sectional view showing the actuation of a cradle actuating switch mounted directly on a circuit board; and FIG. 17 is a fragmentary vertical sectional view, similar to FIG. 16, and showing the cradle actuation with the switch in the closed position.

DETAILED DESCRIPTION OF A PREFERRED EMBODIMENT

Referring now in more detail and by reference characters to the drawings, which illustrate a preferred embodiment of the present invention, T designates a pay telephone which is capable of both a wall mounted position and a stand-alone platform supported position.

The pay telephone T of the invention comprises a six sided outer housing 20 having a pair of somewhat trapezoidally shaped side walls 22, a front wall 24 and a top wall 26 of relatively thin width. The housing is also provided with a bottom wall 28 and a rear wall 30. In the embodiment of the invention as shown, the bottom wall 28 can be relatively flat for supporting disposition on a shelf or other horizontally disposed surface. If desired, small rubber pads or other feet (not shown) could be mounted on the underside of the bottom wall.

The rear wall is also provided with a bracket 32 for securement to a generally vertical wall surface. The bottom wall 28 is also provided with a mounting means in the form of mounting apertures 33 for receiving conventional fasteners to thereby secure the telephone to a horizontally disposed surface. However, it should be understood that other mounting means could be provided on the telephone housing for securement in other positions.

The front portion of the housing is inclined at an angle of between 35° to 65° relative to a vertical center line, in the manner as shown in FIG. 1, from the top wall 26 to the upper edge of the front wall 24. The angle of taper is preferably about 45° to about 50°. Moreover, an enlarged access opening 34 is formed in this front portion of the housing and leads to an interior compartment 36 housing the operating components of the pay telephone, as hereinafter described. The enlarged access opening 34 is covered by a removable closure plate assembly 38 which can be locked into a secured position over the access opening 34, also in a manner to be hereinafter described in more detail.

The closure plate assembly 38 includes a main frame 41 and a face plate 40 is actually mounted on this face plate frame 41. This face plate 40 has an inclined portion matching the inclined front portion of the housing. The closure plate assembly includes a depending leg 42 which extends over and is capable of locking into the front wall 24 of the housing, also in the manner as best illustrated in FIGS. 2 and 3 of the drawings. An upper tab 44 extends into a corresponding notch 46 formed in the front wall 24 for purposes of aligning the front wall and closure plate assembly 38 as well as holding the face plate 40 in the locked position.

The lower end of the depending leg 42 is provided with a lower curved edge 48 (see FIG. 2) capable of fitting under the bottom wall 28 or otherwise into a groove formed in the front of the housing for this purpose. In this way, when the housing is mounted on a horizontally disposed surface, it would be virtually impossible for one to attempt to pry the front of housing open with a screwdriver or other like implement. Moreover, the entire closure plate assembly 38 can be releasably locked to the housing by a lock mechanism 66, as hereinafter described in more detail.

The closure plate assembly 38 is removably mounted onto the housing and, particularly, the top wall 26 of the housing through a unique releasable hinge mechanism 52 and the latter of which is more fully illustrated in FIGS. 2–6 of the drawings. The hinge mechanism 52 allows for a complete closed position of the closure plate assembly 38, as shown in FIG. 2, and a partially opened position, as shown in FIG. 3, to a fully opened position, as shown in FIG. 4 of the drawings. FIG. 6 illustrates a position of the hinge mechanism 52 for complete removal of the closure plate assembly 38. Many of the operating components in the telephone housing have not been shown in FIGS. 2–6 and elsewhere to maintain clarity of illustration for those features which are then being emphasized.

The hinge mechanism 52 generally comprises an arm 54 which fits within a transversely extending elongate slot 56 formed at the top wall 26 of the housing. This arm 54 is rigidly secured to or otherwise integral with the closure plate frame 41. The arm 54 is also provided with an integral depending hook 58, also in the manner as best illustrated in FIGS. 2–5 of the drawings.

By further reference to FIGS. 2–5, it can be seen that the hook 58 is angulated with respect to the arm 54. Moreover, and by reference to FIG. 5, it can be observed that the arm 54 and hook 58 are slidable transversely back and forth within the elongate slot 56 when the closure plate assembly 38 is not in a locked or fully closed position.

When the face plate 40 is located on the housing in a normal position of operation, the hook 58 is located to the rearward end of the elongate slot 56. Moreover, an elbow 60 formed between the hook 58 and the arm 54 will abut against the rearward edge of the slot 56 when the closure plate is in the close position. Further, a depending locking tab 62 is formed on the underside of the top wall 26. It can be seen by reference to FIGS. 2 and 5 of the drawings that when the closure plate assembly 38 is in the fully closed position, the hook 58 will have engaged the underside of the locking tab 62. In this way, the hinge mechanism 52 cannot be moved forward or rearward within the slot 56 and the closure plate assembly 38 will remain in a fully closed position.

When the closure plate assembly 38 is shifted upwardly to the position as shown, for example, in FIGS. 3 and 4, it can be seen that the hook 58 will be rocked out of engagement with the depending locking tab 62. As this occurs, the hinge mechanism 52 will be allowed to either slide back and forth within the slot 56 or rock within that slot 56, allowing the closure plate assembly 38 to be raised and lowered.

By reference to FIG. 4, it can be seen that when the closure plate assembly 38 is in the fully opened position, and is pushed rearwardly within the slot 56, the arm 54 will abut against and physically engage the locking tab 62. In this way, the closure plate assembly 38 will be held in a fully opened position. However, the closure plate assembly 38 can again be shifted to the closed position merely by pulling the entire closure plate assembly 38 forwardly so that the arm 54 is not in locking engagement with the locking tab 62. As this occurs, the entire closure plate assembly 38 will be allowed to rock in the elongate slot 56.

When it is desired to remove the entire closure plate assembly 38, the entire hinge mechanism 52 is shifted to a position where it is intermediate the forward and rearward ends of elongate slot 56. In this position, the entire closure plate assembly can be slightly tilted to one side and lifted vertically so that the hook is removed from and located out of the elongate slot 56.

When removing the entire closure plate assembly 38, the assembly must be shifted slightly to one side or the other in order to provide clearance. In this way, the hook can then be fully disengaged from the depending locking tab 62.

One of the important aspects of the hinge mechanism 52 of this present invention is the fact that the entire closure plate assembly can be shifted to an opened position and can be entirely removed from the housing in absence of any tools. Moreover, no sophisticated manual techniques are required. There are no interlocking fingers which must be disengaged and, hence, no moving parts which must be continuously lubricated. It can also be observed in accordance with the construction as shown thus far, that the closure plate assembly is entirely removable and replaceable. Moreover, the face plate 40 on the closure plate assembly 38 can be removable from the closure plate frame 41. Inasmuch as the entire housing, including the frame 41, is made from relatively rigid and durable material, such as steel or the like, the closure plate is readily changeable in order to substitute a different type of closure plate, if desired.

The entire frame 41, as well as the remaining portions of the housing, are formed of a fairly rigid and durable material, which is relatively tamper proof. Thus, and for this purpose, the entire housing is formed of a steel material. However, it could be formed of other structural materials, as may be desired. In a preferred embodiment, the entire frame 41 and the housing 20 is formed of a type of so-called "armor plate" steel material. In this way, the entire housing is relatively tamper proof. In addition, the housing can be made inexpensively from sheet-steel and it is not necessary to form same in a drawn steel construction.

The closure plate is provided on its lower portion with a bezel 68, which is designed to receive a substrate containing information which may be relevant to the use of the pay telephone or other type of material, as shown in FIG. 9. The bezel 68 comprises a rigid plastic sheet 70, such as that type of sheet made of plastics offered under the name and mark "Lexan". However, any type of durable plastic material which is relatively transparent may be employed for this purpose. In accordance with this construction, the information bearing substrate 72 can be inserted into the bezel from the inside of the housing, thereby precluding defacing or alteration of the information substrate. A slot 74 is formed by a plastic or other bracket 76 on the undersigned of the bezel 68. Thus, by merely opening the housing, it is easy to remove and insert a new information bearing substrate 72.

FIG. 10 illustrates a slightly modified form of bezel construction 80 in which an opening 82 is formed in the face plate and covered by a plastic substrate 84 fitted within and retained by an interiorly presented ridge 86. In this way, an information bearing substrate 72 can be inserted from the rear of the housing against the plastic transparent sheet 84. In either of the embodiments as shown in FIGS. 9 and 10, it is possible to insert information bearing substrate from the inside of the housing thereby precluding defacing or alteration of the information bearing substrate.

In substantially all relatively recent pay telephone constructions, dialing is accomplished through a tone dialing generator, as opposed to a voltage modulation using a full rotary dial. Moreover, in substantially all commercially available pay telephones, the touch tone pad is a separate assembly comprised of bezels, membranes, retaining clips, associated hardware and electrical cables. This pad is usually mounted on the exterior of the telephone housing or otherwise is mounted from the inside with touch tone push button switches extending through openings in the closure plate of the housing. However, the touch tone generator is then electrically connected to the remaining electrical components in the housing by means of electrical cables. One circuit is provided for the touch tone generator and additional electrical circuitry is located elsewhere in the housing and, hence, the two are connected through such electrical conductors. When attempting to locate a circuitry problem in these conventional telephones, during trouble-shooting operations, it is necessary for the field technician to either remove all of the circuit boards or attempt to test individually each of the circuit boards at a field site. This is cumbersome and difficult and oftentimes leads to errors in the trouble-shooting operation.

In accordance with the present invention, all of the electronics for the pay telephone, including certain of the electronics associated with the tone generator, are located on a single circuit board 74, as shown in FIGS. 6, 8 and 12 of the drawings. It can be seen that this circuit board is physically attached to the underside of the closure plate assembly 40, as best shown in FIGS. 6, 8 and 12 of the drawings. In this way, the entire circuit board 74 can be readily and easily removed from the inside of the closure plate assembly 38 when the latter is opened or otherwise, the entire closure plate assembly 38 could be removed and replaced with a new closure plate assembly 38 containing a different circuit board.

The tone dialing pad 76, which is used for dialing, is also mounted on the underside of the closure plate assembly 38, in the manner as best shown in FIGS. 8 and 12 of the drawings. The touch tone dialing pad 76 is provided with a substrate, such as a tone pad 78, and which can contain some of the electronics, if necessary, for operation of the tone generator. However, the electronics associated with tone generation is typically mounted on the circuit board 74.

Mounted on the touch tone dialing pad 78 are a plurality of push button switches 80 which are capable of being depressed by the user of the telephone to initiate tone generation and thereby initiate a dialing sequence. These push button switches are typically mounted within sockets 81 formed in the pad 78 and when depressed, will close a switch and thereby generate a signal for that particular push button switch.

Mounted on the touch tone dialing pad 76 facing the circuit board 74 is a connector 82 having a plurality of outwardly extending connecting pins 84. These pins will fit into and create an electrical circuit with a connector socket 86 on the rear side of the circuit board 74, that is the side facing the touch tone dialing pad 76. In accordance with this construction, it can be seen that when a circuit board is removed from the closure plate assembly 38, it is not necessary to remove any portion of the touch tone dialing mechanism. Pulling of the circuit board will merely disconnect the circuit board from the touch tone dialing pad 76. In like manner, when a circuit board is remounted on the plate, it will automatically connected with the connecting pins 84 on the touch tone dialing pad 76.

The touch tone dialing pad 76 is actually located within a recess 88 formed in the closure plate, in the manner as best shown in FIGS. 8 and 12 of the drawings. Moreover, the tone dialing pad 76 is spaced from the rear side of the circuit board 74 by means of posts 90 which extend from the rear side of the circuit board 74. In addition, spacers 92 are mounted on these posts 90 in order to maintain the desired separation between the tone pad 78 and the circuit board 74.

It can be observed that with this construction, simple alteration of the electronics is easily obtained. Moreover, if desired, the entire touch tone dialing pad 76, with the push buttons 80 mounted thereon, can also be easily removed by lifting the same from the recess 88. As a result, there is no need for complex trouble-shooting at a phone site and there is only a minimum amount of down time, namely, that time required to substitute and change a new circuit board for an existing circuit board, if an electronic problem should arise.

This construction of providing the tone dialing mounted directly to the underside of the circuit board 70 allows for one single circuit board to be used in the pay telephone. Thus, trouble shooting is relatively simple and the repair technician only is required to remove the circuit board 74 with the touch tone circuitry mounted thereon and replace the same with an additional circuit board arrangement also having the touch tone circuitry mounted directly thereon.

The pay telephone of the present invention is also provided with a handset (not shown). The handset removably fits within a cradle 96 secured to the outwardly facing surface of the closure plate assembly 40, in the manner as illustrated in FIG. 1 of the drawings. The handset 94 is typically connected to the telephone housing itself through a conductor 98. In this particular case, the conductor 98 is usually connected to the circuit board 74 through a flexible electrical conductor (not shown). This is essentially the only electrical connection which has to be made in the assembly of the telephone.

Located with in the cradle 96 is a rockable hook 100 and which is more fully illustrated in FIGS. 1, 8, 16 and 17 of the drawings. The hook 100 is mounted on a pivot 102 which is, in turn, journaled in the rear surface of the face plate assembly 40. It can be observed that when the handset is located in the cradle 96, the hook 100 is depressed and shifted downwardly to the position as shown in FIG. 17 of the drawings. In like manner, when the handset is removed for purposes of use, the hook 100 pivots to an upper position, as shown in FIG. 16. For this purpose, a torsion spring 104 is mounted on the pivot 102 to cause an automatic biasing of the hook 100 upwardly when the handset is removed.

Also located directly located on the circuit board 74 is a hook switch 105 having a contact plate 106 and a switch blade 107. It can be observed that the rearward side of the hook 100 has a protrusion 108 which is located to engage the switch blade 107, in the manner as shown in FIG. 16, when the hook 100 is shifted to the upper most position, that is when the handset is lifted from the cradle 96. In this way, the circuit board will automatically energize the telephone. However, when the handset is replaced, the hook 100 will move to the position as shown in FIG. 17 and the switch 105 will close. Inasmuch as the hook switch 105 is mounted directly on the circuit board, there is again no need for other additional wire connections between the hook switch itself and the circuit board or other mechanisms or wire conductors.

Mounted on the rear wall of the pay telephone housing is a escrow bracket 112 which receives a conventional escrow mechanism 114. The bracket 112 includes a mounting plate 116 and forwardly extending arms 118 to receive and hold the escrow mechanism 114.

The escrow mechanism 114 is suitably designed to recognize the receipt of coin currency and to enable operation of the telephone when a proper amount of the coin currency has been so introduced. For this purpose, the closure plate of the housing may be provided with a coin receive slot 120 which allows for an introduction of coin currency into the housing. The escrow mechanism 114 is located so that coins introduced into the housing are dropped through a coin chute 122 (see FIG. 8) and directly into the escrow mechanism 114. When a proper amount of coinage has been properly introduced, and the telephone operation is initiated and completed, the coins will drop from the escrow mechanism 114 into a coin box 124, as best shown in FIGS. 7 and 8 of the drawings.

In addition to or in place of the escrow mechanism, a paper currency reader or so-called "dollar bill acceptor", sometimes called a "DBA", may also be provided in the housing, such that the telephone can be operable upon receipt of a proper amount of paper currency.

The pay telephone housing could also be conventionally provided with a credit card receiving slot 126 (see FIGS. 1 and 13) in order to receive a conventional credit card-debit card, such as an IC chip or so-called "smart card" for operation of the telephone. A credit card reader (now shown) would also be provided and would potentially be mounted on the exterior of the closure plate assembly 38. Again, the credit card reader would be suitably connected to the circuit board 74 in order to initiate operation of the telephone when a credit card has been properly introduced. The credit card reader and the dollar bill acceptor are all conventional in construction and therefore neither illustrated nor described in any further detail herein.

The coin box 124 is mounted at the bottom wall 28 of the housing and is located to receive any coin currency introduced into the escrow mechanism 114. However, it should be understood that a currency box could be substituted for or used in addition to the coin box 124.

The coin box 124 is located in the housing, as best shown in FIGS. 7 and 8 of the drawings. In this case, the coin box 124 is provided with a bottom wall 130 resting against the bottom wall 28 of the housing and a rear wall 132 facing the rear wall 30 of the housing, along with a front wall 134 in proximity to the front wall 24 of the housing. The upper front portion of the coin box 124 is provided with a tapered wall 136 so as to conform to the angle of the closure plate assembly 38.

By reference to FIG. 7, it can be observed that an downwardly extending locking tab 140 is provided for engaging the upper edge of the rear wall 132 forming part of the coin box 124. In addition, a locking tab 142 is formed on the underside of the coin box drawer 124, as also best shown in FIG. 8, and fits within an opening 146 formed at the front wall 24 of the housing. When in this position, it is virtually impossible to remove the coin box 124 until the box is shifted rearwardly and simultaneously lifted upwardly at the front portion thereof so that it can then be lifted from the housing through the access opening.

A single locking mechanism 148 is also provided in the nature of a barrel lock in the manner as shown. Although a barrel lock mechanism has been found to be highly effective for use in the pay telephone housing, any other conventional lock mechanism could be employed for this purpose. The barrel lock mechanism 148 comprises an elongate barrel 150 which extends through the front wall 24 and a screw 151 which extends through the front wall 134 of the coin box. The barrel lock mechanism 148 is also provided with a keyway 152 on the front face thereof. When a key is properly introduced and the barrel lock turned, the barrel lock mechanism can be removed from the front wall of the housing and also simultaneously from the front wall 134 of the coin box 124. As this occurs, the entire closure plate assembly, including the depending plate 42, is opened relative to the housing thereby enabling access through the access opening. In this case, the coin box 124 can then be removed in the manner as previously described.

It can be observed that the coin box 124 actually provides not only a means for accumulating and storing currency coins, but as a means for securing the closure plate assembly 38 to the housing in a locked position. The coin box itself with the integral coin foot and the locking opening maintain both the coin box and the closure plate assembly 38 in a secure and locked position when the lock mechanism 148 is closed. The coin box may be formed of a metal or strong plastic material. When the coin box foot is moved forwardly toward the slot at the front of the housing, it can be drawn into a locked position.

The locking mechanism may be a rigid tubular or flat key tumbler lock of a conventional construction. Furthermore, and although key operated lock mechanisms are normally provided, other types of locking mechanisms could also be used.

The housing 20 is also provided with its own interior coin return chute 156, as best shown in FIGS. 13–15 of the drawings. The coin return chute is essentially somewhat U-shaped and formed by a pair of vertically arranged transversely spaced apart walls 158 connected by a bottom wall 160 and a rear wall 162. The vertically arranged calls 158 are provided at their upper ends with outwardly flaring coin directing flanges 164, also as best shown in FIGS. 13–15 of the drawings. In this way, any coins which are returned directly from either the escrow mechanism 114 are merely dropped into the coin return chute 156 where they will be essentially retained therein.

It can be observed that the formation of the coin return chute 156 allows for easy and convenient fabrication of any coin return mechanism so that no need for a separate and expensive coin return mechanism.

The front wall 24 is also provided with a coin return slot 166 for a user to insert his or her fingers through in order to retrieve coins which have dropped into the coin return chute 156. For this purpose, the bottom wall 160 is provided with a curved upwardly presented surface 168 which enables coins dropped into the chute to be shifted toward the front end of the bottom wall 160. Thus, it is only necessary for the user to insert his or her fingers into the front portion of the coin return chute in order to retrieve returned coins.

In order to preclude improper access to the coin return chute, is a coin return door 170 is provided. This coin return door 170 is provided with a hinge pin 172 at its upper end allowing swingable movement with respect to the coin return slot 166. The hinge pin 172 is suitably journaled in the outwardly flaring coin directing surface 164 forming part of the coin return chute 156.

The lower end of the coin return door 170 is also provided with a curved inwardly directed flange (not shown) to prevent a user's finger from being caught in the coin return door when a coin is being removed from the coin return chute.

This coin return door effectively provides a means to stop the acceleration of the returned currency coins which are introduced into the coin return chute. The coin return door can be formed of a somewhat L-shaped construction to provide a stop in order to limit door travel. For this purpose, the coin return door 170 includes a front panel 176 and a perpendicularly arranged limit movement panel 178, in the manner as best illustrated in FIGS. 14 and 15 of the drawings. When the coin return door 170 is pushed inwardly, the limit movement panel 178 will engage a portion of the interior of the housing and limit the amount of travel of the front panel 176. Furthermore, in order to hold the door in a closed position, a counter-weight 179 can be mounted on the interior surface of the front panel 176.

The face plate 40 is uniquely constructed to provide those structural features mentioned above as well as an aesthetic appearance to the entire telephone set. In addition to the foregoing, the face plate 40 includes a recess 200 and pivotally mounted within that recess 200 is a coin return release lever 202. The coin return release lever 202 would be suitably connected to the escrow mechanism for actuation of same. The recess 200 provides upper and lower movement limiting edges 204 and 206, respectively, to control the limit of movement of the coin return release lever 202. In this way, it is not necessary for limit switches or movement limiting pins or the like to be mounted on the rear surface of the face plate 40 of the closure plate assembly 38.

It can be seen from the foregoing construction that the pay telephone of the present invention allows for disposition in essentially any location and can be either wall mounted or surface supported. In addition, it can be fixedly mounted onto a horizontal surface or otherwise freely movable thereon. In actuality, and in most cases, the housing would be rigidly secured to a supporting surface in order to prevent theft of the entire telephone itself. Nevertheless, depending upon the particular environment, movability is also enabled.

The housing construction is such that assembly of all of the operating components is relatively simple. Moreover, and as indicated above, essentially all of the electronics is contained on a single circuit board and the only operating components which must be inserted into the housing is the escrow mechanism and, for this purpose, a mounting bracket is provided.

When the housing is located in essentially any position, it produces a frontal viewing area where all major user functions are visually accessible.

The housing with the unique closure panel mechanism is highly effective, in that it provides not only an aesthetically pleasing clean hinge line, but that it also enables a simple and quick means for disassembly and removable of the closure panel assembly from the body of the housing. It also eliminates the need for a conventional hinge pin and provides not only a ninety degree open position of the closure plate, but intermediate positions as well and in addition to complete removal.

One of the important factors in the construction of the housing is that many of the components, including the entire outer housing, may be formed from simple sheet metal fabrication. With this housing construction, it is not necessary to use a deep drawn metal forming operation.

As also indicated previously, automatic interfacing of the electrical components and, for that matter, the electromechanical components, is automatically provided when the closure panel assembly is moved to the closed position.

Thus, there has been illustrated and described a unique and novel pay telephone which meets and thereby fulfills all of the objects and advantages which have been sought therefor. It should be understood that many changes, modifications, variations and other uses and applications which will become apparent to those skilled in the art after considering the specification and the accompanying drawings. Therefore, any and all such changes, modifications, variations and other uses and applications which do not depart from the spirit and scope of the invention are deemed to be covered by the invention.

Having thus described the invention, what I desire to claim and secure by Letters Patent is:

1. A telephone set constructed for readily accessible assembly or servicing of operating components in the interior of said set, said telephone set comprising:

a) an outer housing having an interior compartment with operating components in the interior compartment of said outer housing;

b) means forming an enlarged access opening leading into the interior compartment and the operating components therein;

c) an outer closure panel disposable over said access opening closing off access to the interior compartment when in a closed position;

d) a hinge mechanism associated with said closure panel allowing said closure panel to be shifted upwardly about a hinge axis to a fully opened position and automatically locked in the open position and back downwardly to a closed position over said access opening; and e) said housing having an elongate slit receiving an arm on said hinge means and allowing said arm to extend into and through said slit allowing rockable non-slidable movement of the hinge means at the slit and which permits said hinge mechanism to become fully disengaged from said housing and separated from said housing when said closure panel is rotated slightly about an axis angulated away from the hinge axis of the hinge means relative to said housing.

2. The telephone set of claim 1 further characterized in that said hinge mechanism comprises:
 a) an elongate slit in said housing;
 b) an arm extendable through an elongate slit in said housing and having a portion of said arm secured to and movable with said panel; and
 c) hook means on an end of said arm and engaging a member on said housing to lock in the fully closed position on said housing and to also hold the panel is in the fully opened position.

3. The telephone set of claim 1 further characterized in that said hinge mechanism comprises:
 a) an elongate slot formed in said housing;
 b) an arm extendable through an elongate slit in said housing and having a portion of said arm secured to and movable with said panel; and
 c) a hook on an end of said arm and extending outwardly from said arm and being located inwardly with respect to said housing; and
 d) a depending tab associated with said member and being located to engage said hook when the panel is in a closed position with respect to the access opening but being of such size so that said hook can be removed therefrom when said panel is rocked upwardly toward an open position.

4. The telephone set of claim 1 further characterized in that said arm is located to be engagable with said tab when said panel has been shifted to an open position to then hold the panel in the open position.

5. The telephone set of claim 1 further characterized in that said arm is shiftable in said slot away from said tab to enable said panel to be rocked downwardly toward a closed position, said slot being sized so that said panel can be rotated slightly with respect to said housing allowing the arm and hook to be completely removable from said blot thereby allowing complete removal of said panel from said housing.

6. A pay telephone constructed to enable easy access to the interior of said telephone for maintenance and repair, and for also gaining access to currency deposited therein, and also for closing the telephone with a single locking and unlocking action, said telephone comprising:
 a) an outer housing having an interior for receiving certain operating components therein;
 b) a front wall on said outer housing;
 c) an enlarged access opening in said front wall leading into the interior of said housing and the operating components therein;
 d) a cover plate disposed over said enlarged access opening for closing said interior precluding access therein and providing access to the interior when removed from the closed position;
 e) a currency box in the interior of said housing for receiving a currency during operation of said telephone;
 f) means holding said currency box in said interior of said housing until manually removed therefrom; and
 g) lock means connecting said cover plate to said housing and permitting said cover plate to be locked relative to said opening to said currency box thereby precluding access to the interior or to the currency box until said lock means is authorizedly opened.

7. The pay telephone of claim 6 further characterized in that said means holding said currency box is a lip on said currency box engagable in a slot on said housing so that the box can be releasably locked in said interior of said housing until manually removed therefrom.

8. The pay telephone of claim 7 further characterized in that said lock means has a portion fitted into and through said currency box and locking to the currency box through the front of the housing and that an additional retaining means in said housing holds said currency box on a base of said housing.

9. The pay telephone of claim 8 further characterized in that said currency box is a coin currency box.

10. A telephone set constructed so that it can be wall mounted on a supporting structure or supported on a relatively flat generally horizontal surface, said telephone set comprising:
 a) an outer housing having an interior compartment;
 b) an upwardly and rearwardly inclined front wall on said housing and which is inclined at an angle of between about 45° to about 50°;
 c) means forming an enlarged access opening in said front wall and leading into the interior compartment;
 d) an outer closure panel disposed over said access opening and being located at an angle of between about 45° to about 50°; and
 e) a printed message information section on said closure panel and being relatively visible when said housing is located in either a wall mounted position or generally horizontally disposed surface.

11. The telephone set of claim 10 further characterized in that a touch tone dialing pad is on said closure plate and is readily accessible by a user in either position.

12. The telephone set of claim 10 further characterized in that a hook switch is also mounted on said closure plate for receiving a handset of the telephone.

13. A telephone set constructed for readily accessible assembly or servicing of operating components in the interior of said set, said telephone set comprising:
 a) an outer housing having an interior compartment with operating components in the interior compartment of said outer housing;
 b) means forming an enlarged access opening leading into the interior compartment and the operating components therein;
 c) an outer closure panel disposable over said access opening closing off access to the interior compartment when in a closed position;
 d) a hinge mechanism associated with said closure panel allowing said closure panel to be shifted upwardly about a hinge axis to a fully opened position and automatically locked in the open position and back downwardly to a closed position over said access opening;
 e) said housing having an elongate slit receiving an arm on said hinge means and allowing said arm and the hinge mechanism to become fully disengaged from said housing and separated from said housing when said closure panel is rotated slightly relative to said housing;
 f) an arm extendable through an elongate slit in said housing and having a portion of said arm secured to and movable with said panel;

g) a hook on an end of said arm and extending outwardly from said arm and being located inwardly with respect to said housing; and h) a depending tab associated with said member and being located to engage said hook when the panel is in a closed position with respect to the access opening but being of such size so that said hook can be removed therefrom when said panel is rocked upwardly toward an open position.

14. A pay telephone apparatus constructed for readily accessible assembly or servicing of operating components in the interior of said apparatus, said telephone apparatus comprising:

a) an outer housing having an interior compartment with operating components in the interior compartment of said outer housing;

b) means forming an enlarged access opening leading into the interior compartment and the operating components therein;

c) an outer closure panel disposable over said access opening closing off access opening to the interior compartment when in a closed position;

d) a hinge mechanism associated with said closure panel allowing said closure panel to be shifted upwardly about a hinge axis to a fully opened position and automatically locked in the open position and back downwardly to a closed position over said access opening;

e) said housing having an elongate slit receiving an arm on said hinge means and allowing said arm to extend into and through said slit allowing rockable non-slidable movement of the hinge means at the slit and which permits said hinge mechanism to become fully disengaged from said housing and separated from said housing when said closure panel is rotated slightly about an axis angulated away from the hinge axis of the hinge means relative to said housing;

f) a dialing mechanism mounted on said closure panel for introducing a dialing signal and having a plurality of push button switches located externally on said closure panel;

g) a touch tone generator associated with said dialing mechanism and located interiorly in said interior compartment;

h) a circuit board containing substantially all of the electronic circuitry necessary for operation of said telephone apparatus and also including said tone generator;

i) means associated with said circuit board carrying the tone generator and the push button switches and which tone generator directly, physically and electrically connects with the electronic circuitry on said circuit board such that lanyard circuitry connecting the electronic circuitry to the tone generator is not required;

j) a currency box for receiving coin or paper currency located in the interior of said housing and which receives coin or paper currency during an operation of the telephone apparatus;

k) means holding said currency box in said interior of said housing until manually removed therefrom;

l) lock means connecting said closure panel to said housing and permitting said closure panel to be locked relative to the interior to preclude any access to the currency box and precluding access to the interior of the housing or the currency box until said lock means is authorizedly opened;

m) said closure panel also having an inclined frontwall at an angle of about 45° to 50°;

n) means forming an enlarged access opening in said closure panel and leading into the interior compartment;

o) said closure panel being disposed over said access opening and being located at an angle of about between 45° to 50°;

p) an information section on said closure panel and being visible when the housing is located in an either wall mounted position or generally horizontally disposed surface;

q) a recessed formed in a front face of said closure panel and having upper and lower movement limiting edges; and r) a coin return release lever mounted in said recess for movement to enable a return of coin currency and where movement of said lever is limited by said upper and lower movement limiting edges.

* * * * *